United States Patent [19]

Asfar

[11] Patent Number: 5,600,740
[45] Date of Patent: Feb. 4, 1997

[54] NARROWBAND WAVEGUIDE FILTER

[76] Inventor: Omar R. Asfar, 39 J Terrace View Apts., Blacksburg, Va. 24060

[21] Appl. No.: 493,121

[22] Filed: Jun. 20, 1995

[51] Int. Cl.$^6$ .................................................. G02B 6/26
[52] U.S. Cl. ............................ 385/27; 333/208; 385/37; 385/125
[58] Field of Search .................................. 333/208–212; 385/1, 4, 14, 15, 27–29, 37, 39, 123–127, 129, 130

[56] References Cited

U.S. PATENT DOCUMENTS

| | | | |
|---|---|---|---|
| 3,046,503 | 7/1962 | Cohn | 333/73 |
| 3,271,706 | 9/1966 | Rooney | 333/73 |
| 3,597,710 | 8/1971 | Levy | 333/210 |
| 3,831,038 | 8/1974 | Dabby et al. | 307/88.3 |
| 3,851,282 | 11/1974 | Watson | 333/73 |
| 3,891,302 | 6/1975 | Dabby et al. | 385/37 |
| 3,909,755 | 9/1975 | Kaunzinger | 333/208 X |
| 3,916,182 | 10/1975 | Dabby et al. | 385/4 X |
| 3,936,144 | 2/1976 | Caton | 350/96 C |
| 3,939,439 | 2/1976 | Fletcher et al. | 331/94.5 |
| 3,949,327 | 4/1976 | Chapell | 33/73 |
| 4,233,579 | 11/1980 | Carlson et al. | 333/204 |
| 4,634,914 | 1/1987 | Ballato | 310/313 |
| 4,646,039 | 2/1987 | Saad | 333/210 |
| 4,673,903 | 6/1987 | Saad | 333/210 |
| 4,675,631 | 6/1987 | Waggett | 333/210 |
| 4,725,798 | 2/1988 | Igarashi | 333/212 |
| 4,790,614 | 12/1988 | Imoto et al. | 350/96.12 |
| 4,849,723 | 7/1989 | Oliver, Jr. | 333/208 |
| 4,879,487 | 11/1989 | Sugai et al. | 310/313 |
| 4,956,620 | 9/1990 | Moeller | 333/22 |
| 5,013,115 | 5/1991 | Kashyap | 350/96.14 |
| 5,142,255 | 8/1992 | Chang et al. | 333/204 |

OTHER PUBLICATIONS

J. P. Webber, "Spectral characteristics of coupled--waveguide Bragg-reflection tunable optical filter", Oct. 1993, pp. 275–284, IEEE Proc. J. vol. 140, No. 5.

Sylvian Lessard & Weipin Huang, "Assessment of Coupled--Mode Theory for Tapered Optical Couples", Mar. 1993 pp. 405–407, J. Lightwave Tech. vol. 11, No. 3.

O. R. Asfar & M. Hussein, "Numerical Solution of Liner Two–Point Boundary Problems via the Fundamental–Matrix Method", pp. 1205–1216, Int. Journal for Num. Meth. In Eng., vol. 28.

O. R. Asfar, "Calculation of Filter Response of a Dielectric Slab Waveguide Having Multiperiodic Interface Corrugations via the Fundamental Matrix Method", 1989, pp. 697–709, Virginia, Journal of E. M. Waves & Applications, vol. No. 8 [no month].

Primary Examiner—John D. Lee
Attorney, Agent, or Firm—Sheldon H. Parker

[57] ABSTRACT

The present invention is a passband-type waveguide filter in which a periodic distortion is employed which has a sinusoidal, or alternately configured, distortion, which changes phase at a point along the periodic distortion. The passband filter comprises essentially any waveguide, designed as a waveguide, with a periodic distortion added to at least one of the sides of the waveguide. The waveguide can be a rectangular cross section metallic microwave type, cylindrical, elliptical, or microstrip. The waveguide may be optical, a SAW type waveguide or any waveguide of the prior art. In a preferred embodiment a waveguide structure supports propagation of a wave along the waveguide, the waveguide structure containing a boundary and the waveguide structure containing a filter portion having a portion of said boundary with a sinusoidal distortion following:

$$f(z)=1+A \sin (k_w z) \text{ for } 0<=z<=L/2$$

$$f(z)=1-A \sin (k_w z) \text{ for } L/2<=z<=L$$

where f(z) is a distance perpendicular to the boundary, z is a distance along the wall in the direction of wave propagation, A is a dimensionless amplitude <<1, kw is the boundary wave number chosen to satisfy the Bragg condition $k_w=2k_m$, and L is the length of the filter portion waveguide.

18 Claims, 7 Drawing Sheets

FIG.1  Prior Art
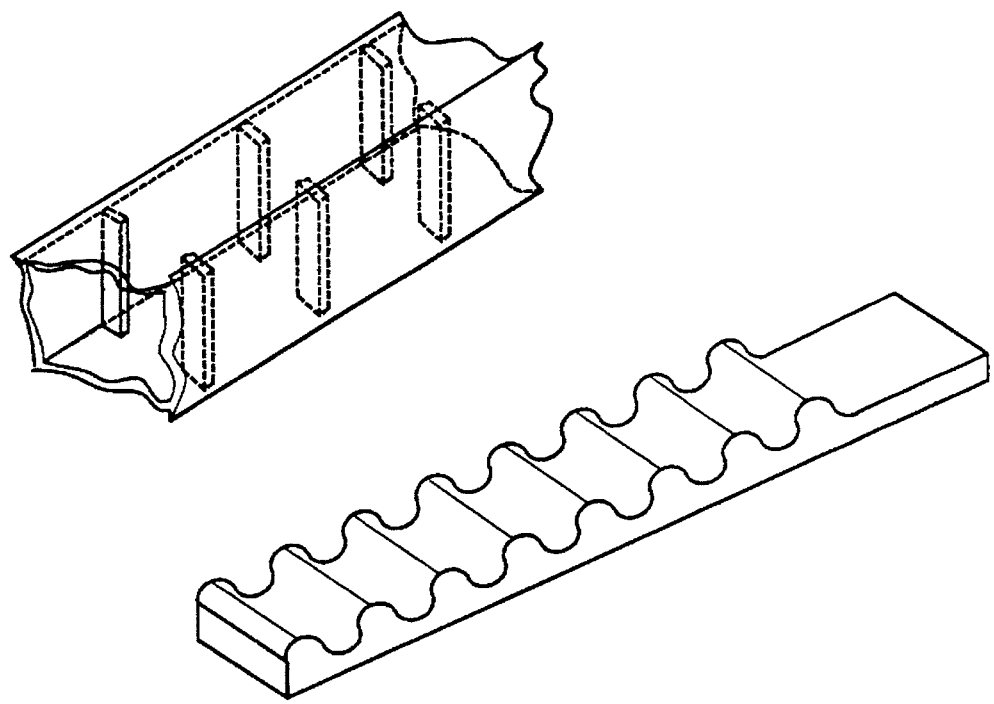
FIG.2  Prior Art
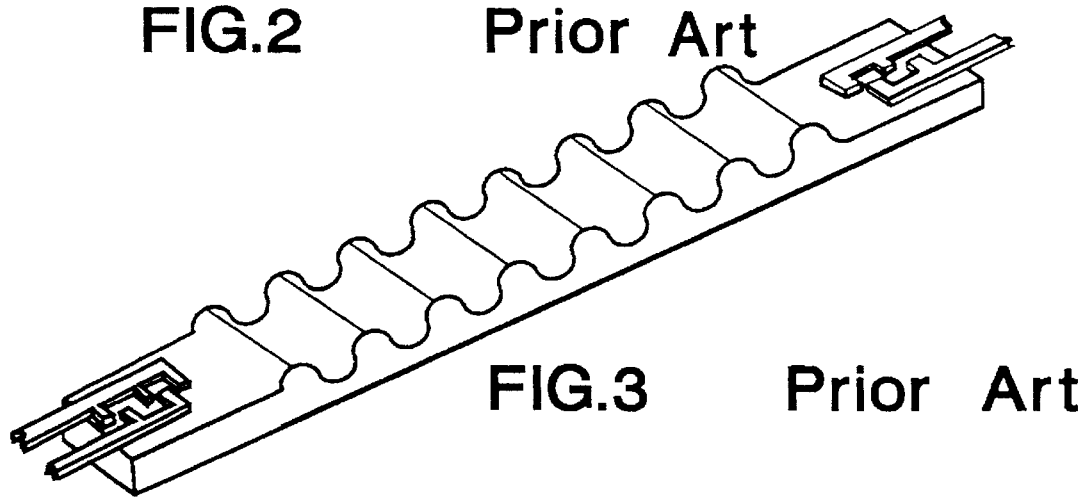
FIG.3  Prior Art
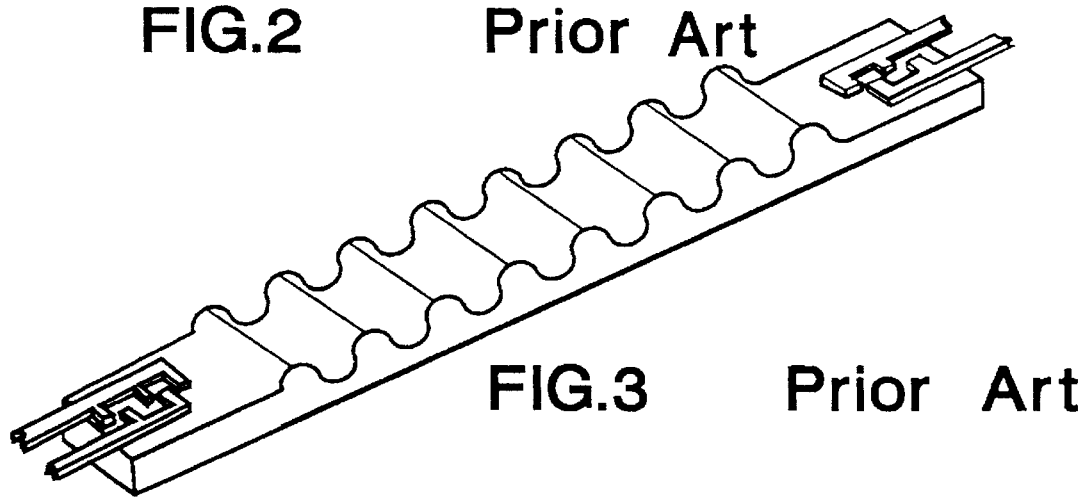
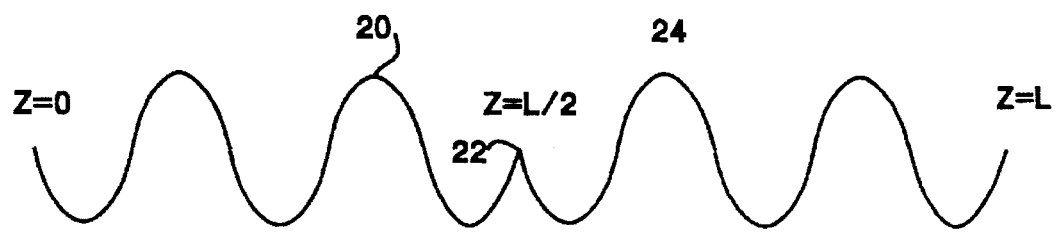
FIG.4

POWER REFLECTION COEFFICIENT (R) OF AN ACOUSTIC WAVEGUIDE SHOWING A TYPICAL FREQUENCY RESPONSE

NARROWBAND WAVEGUIDE FILTER

FIELD OF THE INVENTION

This invention relates to an improvement to waveguide filters of any variety involving basic wave phenomena, such as electromagnetic waves or sound waves. More particularly, this invention relates to bandpass waveguide filters having a periodic structure.

BACKGROUND OF THE INVENTION

Many varieties of waveguide filters are presently known involving periodic structures such a periodic corrugations. Such waveguides can be open or closed, involve ultrasound or electromagnetic waves and, if electromagnetic, can be light, microwave, millimeter or other ranges.

Periodic structure filters can be looked at from two perspectives. The first, is as a circuit which has periodic inductive or capacitive loading. The second perspective, is as a Bragg-type interference device in which wave reflecting of the periodic structures undergo interference. Typically such devices have a corrugation which is rectangular on one or two surfaces.

The prior art devices included typically rectangular cross section waveguides, normally with a conductive rectangular outer surface for the sub-light frequencies and transparent dielectric slabs with lower index of refraction dielectrics on either side and a rectangular cross section for light. Surface acoustic wave devices were formed in which an electromagnetic waveguide fed into a piezoelectric slab which again fed into an electromagnetic waveguide. Periodic perturbations employed for sub-light wavelengths were in the form of rectangular corrugation structures which extended part of the way through the waveguide and repeated several times along the length of the waveguide. The structures could be on one, two or more surfaces and may taper. The corrugations were metallic and created a periodic inductive or capacitive loading. Similar devices were formed in cylindrical waveguide, in which periodic constrictions were employed to serve essentially the same function. In the optical frequencies, one or both of the surfaces would have either a rectangular or sine-wave corrugation structure. Also known to the prior art are embodiments in which a periodic variation in index of refraction are employed. In these devices light is reflected off the sides and the reflective waves undergo interference which is employed for a frequency-dependent filtering behavior.

In a surface acoustic wave type device, a rectangular or sine wave type corrugation on one surface of the piezoelectric reflects vibrational waves induced by a piezoelectric effect, the vibrations undergoing interference and creating a filtering effect. These corrugations, also known as periodic loading, act as bandpass filters with an infinite number of passbands.

Corrugations can also be employed to create a stopband filter (in the millimeter wave domain being configured with inductive load) the design concepts well known to the prior art.

Corrugated or periodic waveguide filters can also be employed in frequency selective multiplexers, 1 to 2 couplers or switches, the basic concepts of which are considered known to those skilled in the art.

Examples of such wave guide filters and other corrugated wave type devices include the following documents all hereby incorporated by reference, as though recited in full:

Saad, U.S. Pat. No. 4,673,903. This device is a waveguide low-pass filter with three separate ridges spaced longitudinally, giving groups associated with shunt capacitances and the spaces with series inductance. The device has operates as a passband in the TE10 mode.

Ballato, U.S. Pat. No. 4,634,914. This device is a bandstop SAW type device.

Fletcher et al, U.S. Pat. No. 3,939,439. This device is a capillary tube for use in a waveguide laser with a corrugation with a periodicity of lambda/2.

Imoto et al, U.S. Pat. No. 4,790,614. This device is an optical filter employing a periodic structure. The device is disclosed as having passband and stopband variations.

Caton U.S. Pat. No. 3,946,144. This device is a frequency selective optical coupler.

Sugai et al, U.S. Pat. No. 4,879,487. This device is a surface-acoustic wave device formed of a glassy layer on a piezoelectric layer with periodic grooves which can be used as a reflector.

Wagget U.S. Pat. No. 4,675,631. This device is a waveguide bandpass filter having multiple waveguide sections including alternating ridge waveguide sections and evanescent waveguide sections.

Imoto et al U.S. Pat. No. 4,790,614. This device is an optical filter in which a periodic structure of index of refraction is formed in the waveguide.

Chang et al U.S. Pat. No. 5,142,255, Carlson et al U.S. Pat. No. 4,233,579 discloses a strip transmission line employing a periodic structure.

Chapell U.S. Pat. No. 3,949,327 discloses a waveguide low pass filter which employs periodic corrugation.

Carlson et al, U.S. Pat. No. 4,233,579. This device is a stripline type filter employing a periodic structure.

The prior art devices also include other type of filters, such as YIG filter. The prior art devices have many uses, they have, however, failed to create a bandwidth as narrow as desirable for many applications. Prior art device can also be physically too large for some applications or have other disadvantages, such as sideband problems or requirement of biasing voltages and the like.

SUMMARY OF THE INVENTION

It is an object of the present invention to provide a bandpass filter with a very narrow bandwidth transmission curve. It is also an object of the present invention to provide a bandpass filter with a high attenuation of the non-passband with very clean sides. It is yet another object of the present invention to provide a bandpass filter in which the passband is separated from the side bands by a guard band. It is yet further objects of the present invention to provide a filter which is short in length. Additionally, it is an object of the present invention to provide a filter with the advantage of allowing direct connection, without the D.C. biasing required by filters such as YIG filters.

The present invention is a passband-type waveguide filter in which a periodic distortion is employed which has a sinusoidal distortion, which changes phase at a point along the periodic distortion. The passband filter comprises essentially any waveguide, designed as a waveguide, with a periodic distortion added to at least one of the sides of the waveguide. For example, the waveguide can be a rectangular cross section metallic microwave type, cylindrical, elliptical, or microstrip. The waveguide can be optical, a SAW type waveguide or any waveguide of the prior art.

One preferred embodiment of the instant invention is a waveguide filter having a waveguide structure which supports propagation of a wave along the waveguide, the waveguide structure containing a boundary and the waveguide structure containing a filter portion having a portion of said boundary with a sinusoidal distortion following:

$f(z)=1+A \sin (k_w z)$ for $0<=z<=L/2$ $f(z)=1-A \sin (k_w z)$ for $L/2<=z<=L$ where f(z) is a distance perpendicular to the boundary, z is a distance along the wall in the direction of wave propagation, A is a dimensionless amplitude <<1, $k_w$ is the boundary wave number chosen to satisfy the Bragg condition $k_w=2k_m$, and L is the length of the filter portion waveguide.

Another preferred embodiment of the invention is a method of filtering a wave signal including injecting an electromagnetic or vibrational wave into a waveguide having a boundary and filter portion, and receiving or detecting the portion of the wave transmitted by the waveguide, wherein the the filter portion of the waveguide contains portion of which has a sinusoidal distortion following:

$f(z)=1+A \sin (k_w z)$ for $0<=z<=L/2$ $f(z)=1-A \sin (k_w z)$ for $L/2<=z<=L$ where f(z) is a distance perpendicular to the wall, z is a distance along the wall in the direction of wave propagation, A is a dimensionless amplitude <<1, $k_w$ is the wall wave number chosen to satisfy the Bragg condition $k_w=2k_m$, L is the length of the filter portion of waveguide.

An example of preferred embodiment includes the above where the waveguide structure has a transparent slab with a reflecting top and bottom surface forming the boundary and configured to propagate light along the slab, with the distortion being formed in at least one of the top and bottom surfaces so as to vary the distance between the top and bottom surfaces.

Another example of the preferred embodiment includes the above in which the waveguide structure has a a hollow or dielectric filled rectangular cross section conductive tube configured to propagate electromagnetic waves. The inner side of the conductive tube forms the boundary and the distortion is formed along at least one side of the rectangular tube so as to vary the width of the tube along the at least one side.

In yet another example of the preferred embodiment, the above method or waveguide filter has a waveguide structure with a hollow, or dielectric filled, elliptical cross section conductive tube configured to propagate electromagnetic waves. The inner side of the conductive tube forms the boundary and the distortion is formed as a variation of the major and minor axes of the inner side of the conductive tube.

In yet another example of the preferred embodiment, the above method or waveguide filter the waveguide structure has a thin rectangular slab which supports a vibrational wave along the slab. The boundary is the side surfaces of the rectangular slab, and the distortion is formed along at least one side of the rectangular slab so as to vary the width of the slab along at least one side.

In yet another example of the preferred embodiment, the above method or waveguide filter has a waveguide structure which has a conductive plane and an elongated conductive strip. The distortion is formed along at least one edge of the conductive strip so as to vary the width of the conductive strip.

In yet another example of the preferred embodiment, the above method or waveguide filter has two or more filter portions in series.

BRIEF DESCRIPTION OF THE DRAWINGS

The advantages of the instant disclosure will become more apparent when read with the specification and the drawings, wherein:

FIG. 1 is an example of a periodic rectangular microwave waveguide filter of the prior art;

FIG. 2 is an example of a periodic rectangular optical filter of the prior art;

FIG. 3 is an example of a periodic surface acoustic wave filter of the prior art;

FIG. 4 is a side view of the periodic distortion of the current invention;

DETAILED DESCRIPTION OF THE INVENTION

Figure 5:
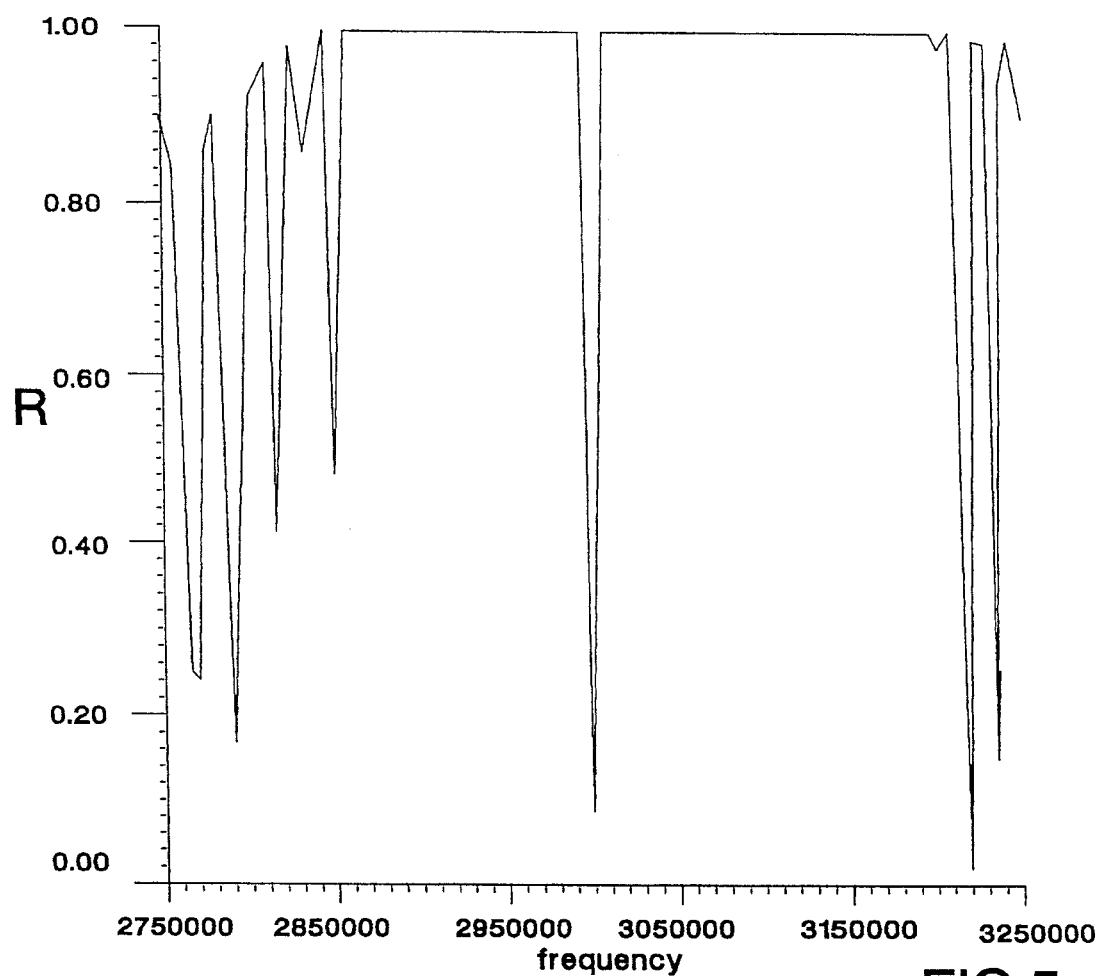
FIG. 5 is the power reflection coefficient of an acoustical waveguide showing a typical response.

The instant invention is an improved waveguide of general applicability, which may be open or closed, and can be applied to any form of guided wave. The applicable guided waves are those such as electromagnetic including light, microwave or millimeter, or acoustic such as ultrasound or SAW (surface acoustic waves), in which one or more surface has a sinusoidal perturbation over a length L, which reverses at the midpoint of the waveguide (L/2). The waveguide may be any of the well known varieties, such as, microwave/millimeter wave, stripline or hollow conductor, with any cross section, such as, for example, rectangular or elliptical. The waveguide may also be of the surface wave variety, such as a SAW device. The waveguide may also be of the variety in which several layers of transparent material with different dielectric constants are stacked, and the wave is guided by internal reflection. The waveguides can be stimulated to operate in any mode such as, for instance, $TE_{10}$ or $TM_{10}$, or in any combination of modes.

The instant invention utilizes the manufacturing and generic design techniques which are well known in the prior art. Each of the many possible embodiments of the instant invention are improvements to prior art waveguides, as illustrated in FIGS. 1, 2 and 3, with the improvement that one or more of the surfaces contains the disclosed sinusoidal perturbation 20 which reverses phase 24 at the midpoint 22, as is illustrated in FIG. 4. For example, a rectangular hollow conductor waveguide may be employed, with the standard design well known in the art for the wavelength, mode and other parameters of interest. One of the side walls then would have the disclosed sinusoidal curve which reverses phase at the midpoint. The mathematical description of the resulting wall distortion is the following function:

$$f(z)=1+A \sin (k_w z) \text{ for } 0<=z<=L/2$$

$$f(z)=1-A \sin (k_w z) \text{ for } L/2<=z<=L$$

where f(z) is a distance perpendicular to the wall, z is a distance along the wall in the direction of wave propagation A is a dimensionless amplitude <<1

$k_w$ is the wall wave number chosen to satisfy the Bragg condition $k_w=2k_m$.

L is the length of the waveguide, preferably $=2NP_w=4\pi N/k_w$ in which $P_w$ is the period of the wall corrugation, and N=0(10) which is an integer. The two sine waves at L/2 intersect at the point in which the sine wave goes through one of its zeros, either after $\pi$ or $2\pi$ radians.

The amplitude at the intersection of the two sine waves at L/2 is zero. There are manufacturing design constraints in choosing the L/2 intersection point when using hollow metallic waveguides. Since the midpoint 22 is a sharp edge, the midpoint 22 can be cut into the surface with good accuracy if it is protruding upward from the surface. However, if the midpoint 22 is cut into the surface as a groove (i.e. the midpoint 22 is one half-cycle further), it is difficult to produce this cut with a sharp edge into the metal. In microstrips, however, there are no such constraints and the midpoint 22 can be cut in either location.

Theoretical analysis of wave propagation in such a waveguide is done with the help of perturbation theory; namely the method of multiple scales is used to derive the equations of mode interaction. The interacting modes are the incident mode with wave number $k_m$ and its reflection. Application of the boundary conditions at z=0 and z=L (the incident mode is excited at z=0 while the reflected mode vanishes at z=L) leads to a two-point boundary-value problem. Computational methods for analyzing the device of the instant invention and theoretical analysis are given in O. Asfar, A. Hussein and A. Ijjeh, "Application of the Fundamental Matrix Method for Two-Point Boundary-Value Problems to Mode Coupling in a Parallel-Plate Waveguide Having Multi-periodic Wall Corrugations", *IEEE Trans. Magnetics*, Vol. 25, No. 4, Jul. 1989, pp 2989–2991, and in Omar Asfar, "Calculation of Filter Response of a Dielectric Slab Waveguide Having Multi-periodic Interface Corrugations Via the Fundamental Matrix Method", *Journal of Electromagnetic Waves and Applications*, Vol. 3, No. 8, 1989, pp. 697–709, both of which are hereby incorporated by reference as though recited in full. Numerical solution of the filtering problem is outlined in the foregoing publications, yielding the frequency response of the proposed corrugation function. The foregoing equation is seen to have a passband with extremely narrow bandwidth. An example of such a calculation is shown in FIG. 5 which has a 3-dB bandwidth at 3 MHz approximately equal to 0.13%. When two sections of this waveguide are connected in tandem, the corresponding bandwidth drops to less than 0.1%. These results are based on calculations made for a Rayleigh surface mode in an ultrasonic waveguide.

As another example, the filter structure can be a planar optical waveguide, designed appropriately as is well known in the art for the wavelengths and modes of interest. One of the surfaces is provided with a periodic distortion as described above.

Alternatively, the distortion can be on two surfaces, with the waves on the two surfaces 180° out of phase with each other, providing a variable width when the distortions are on two surfaces.

The surfaces to be used depend on the type of waveguide. In dielectric slab or thin film waveguides, the top and bottom surfaces can be used. In surface surface acoustic wave (SAW) waveguides supporting the Rayleigh wave, only the upper surface is used. In the case of a hollow conductor of rectangular cross section being used as a waveguide to support the $TE_{10}$ mode, the sides are used, as opposed to the top or bottom surfaces. In general, any surface that has an essential boundary condition that is determinative of the waveguide mode of propagation can be used for the distortions.

The thickness of the waveguide is determined such that the unperturbed waveguide supports the fundamental mode of propagation; e.g., an optical thin film or slab waveguide would be in the order of 1 μm or less. A microwave rectangular waveguide in the x-band (8 GHZ –12.4 GHZ) has a nominal separation between sides equal to 22.86 mm (this is the waveguide that is commercially designated as WR-90 having a height of 0.4 inches and a width of 0.9 inches).

The total length of the periodic distortions, and consequently the filter section, is preferably at least 20 periods (wavelength) of the maximum depth of the waveguide cross-sectional dimension; however fewer wavelengths can be used. The wavelength (length of one periodic corrugation) is determined from the Bragg condition after selection of the desired midband frequency. If this frequency is $f_m$, then the wave number of the dominate mode of propagation $k_m$ is calculated for the waveguide type that is being used from the corresponding dispersion relation. From the Bragg condition the distortions have a wave number $k_w$ equal to twice $k_m$. Hence, the length of one period is:

$$\Lambda_\omega=2\pi=\pi/k_m$$

For other waveguides (dielectric slab, stripline or microstrip, SAW) $k_m$ is determined by numerical or graphical solution of the Eigen value equation involved.

Variation of the overall length of the periodic distortions influences the level of attenuation within the stopband and changes the width of the passband. The attenuation increases as the length of the filter is increased. Variation of $\Lambda_\omega$ is a good mechanism for tuning the filter. An open strain can be induced mechanically to produce a change in $\Lambda_\omega$ and hence tune the filter. There is also another mechanism for tuning such filters without changing $\Lambda_\omega$. In dielectric waveguides fabricated using IN GaAsP, injection of carriers introduces a slight change in index of refraction and thereby changing the center frequency of the passband (see J. P. Weber, "Spectral Characteristics of Coupled-Waveguide Bragg-Reflection Tunable Optical Filter", *IEEE Proceedings Journal*, vol. 140, no. 5, October 1993).

For closed rectangular waveguides, tuning may be effected in the following ways: (1) by providing that the corrugated sidewall is inclined at an angle to the direction of wave propagation, (2) by changing the index of refraction of the medium inside the waveguide walls, such as by inserting a dielectric rod, and (3) by changing the pressure of the gas inside the waveguide, thereby changing the dielectric constant.

The following is a set of examples of specific embodiments of the periodic filter of the present invention. As examples, they should in no way be taken as limiting the scope of the invention.

EXAMPLE 1

Rectangular microwave waveguide

Figure 6:
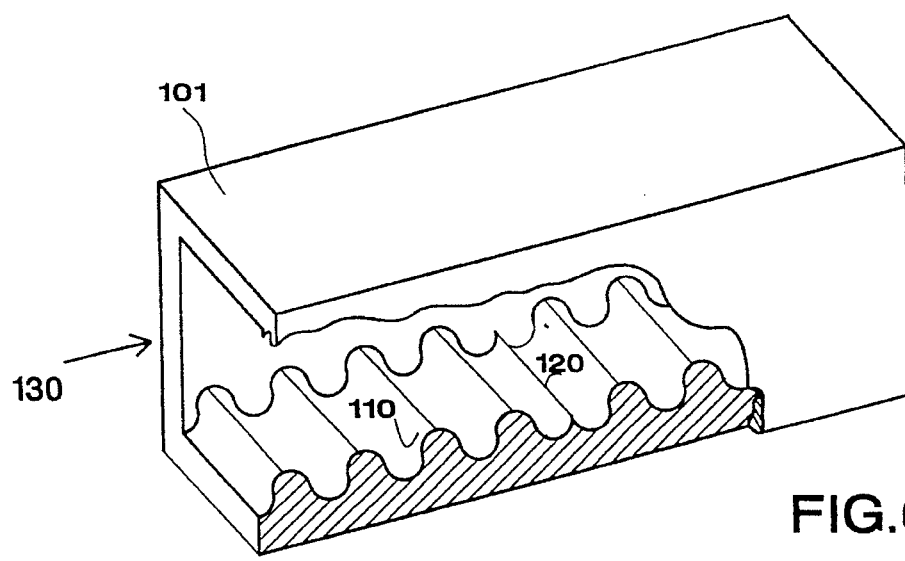
FIG. 6 is an illustration of an embodiment of the current invention of rectangular cross-section for microwaves.

In this embodiment, shown in FIG. 6, a standard hollow rectangular waveguide 101 is employed with a hollow, or dielectric filled, conductive waveguide portion and wave propagation direction 130. The waveguide can be dimensioned in accordance with the desired propagating waves and modes in accordance with standard practices. One side surface has corrugations as a periodic structure 110 as described above. In the central portion 120 the phase of the periodic portion reverses.

As an experimental model, a WR 90 rectangular waveguide (a commercial waveguide for x-band microwave with a width of 0.9 inches and a height of 0.4 inches) supporting the $TE_{10}$ mode was employed to design an X-band microwave filter based on the corrugations described in the above equation. The amplitude of the wall corrugations was 1.5 mm and the length of the waveguide filter was 40 cm. A narrow passband centered at 10.85 GHz was obtained with a 3-dB bandwidth of 10 MHz. This provided a clean response having only one side ripple with a guard band of 300 MHz on both sides of the midband response. This amounted to approximately a 0.1% bandwidth.

Figure 7:
FIG. 7 is a comparison of the transmission coefficient of the difference mode filter vs. Yig filter.

FIG. 7 summarizes the result of the experiment. The upper trace represents the transmission coefficient of the instant filter while the lower trace represents the response of a conventional YIG filter. The former was obtained with a 50.3 mV per division setting on the oscilloscope while the latter was obtained with a 20 mV per division. The filter disclosed in the instant invention produced a response almost seven times stronger than the YIG filter. The instant invention provided a narrower bandwidth than the prior art filters.

The thickness of the waveguide is determined such that the unperturbed waveguide supports the fundamental mode of propagation; the WR-90 microwave rectangular waveguide has a nominal separation between sides equal to 22.86 mm.

The total length of the periodic distortions should be at least 20 periods (wavelengths) of the maximum depth of the waveguide cross-sectional dimension, however fewer wavelengths can be used. The wavelength (length of one periodic corrugation) is determined from the Bragg condition after selection of the desired midband frequency. If this frequency is $f_m$, then the wave number of the dominate mode of propagation $k_m$ is calculated for the waveguide type that is being used from the corresponding dispersion relation. The wave number $k_m$ is given by:

$$k_m = (2\pi/a \cdot \lambda_o)\sqrt{a^2 - (\lambda_o/2)}$$

where a=waveguide width and $\lambda = c/f_m$ is the free space wavelength (c is the speed of light). From the Bragg condition, the distortions have a wave number $k_w$ equal to twice $k_m$. Hence, the length of one period is:

$$\Lambda \omega = \frac{2\pi}{k_w} = \frac{\pi}{k_m}$$

EXAMPLE 2

Rectangular optical waveguide.

Figure 8:
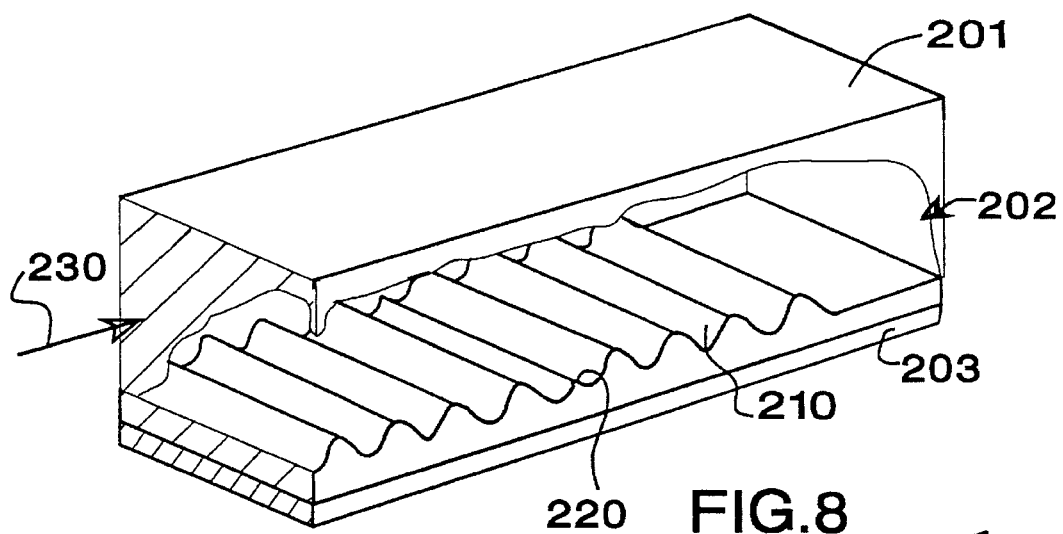
FIG. 8 is an illustration of an embodiment of the current invention of rectangular cross-section for light.

In this embodiment, illustrated in FIG. 8, an optical wave is confined to a transparent planar waveguide indicated generally as 202, with a propagation direction 230. The periodic corrugation 210 is manufactured with a predetermined index of refraction, with the surrounding substrates 201 and 203 manufactured from a material with an index of refraction lower than that of the periodic corrugation 210. Because of the index of refraction difference, the light is confined within the waveguide 202 by total internal reflection, as is well known in the art. The periodic corrugation 210 is perturbed sinusoidally in the manner described above. The substrate 201 should also have an index of refraction lower than the periodic corrugation 210 and is preferably manufactured from the same material as the substrate 203. Alternatively, the substrate 201 can also be air. At the midpoint 220, the phase of the perturbation changes as described above.

The periodic corrugation 210 is a thin film deposited onto or built into the substrate by methods known in the art, such as vapor deposition, ion implantation or molecular beam epitaxy. As stated, the material used for the deposited film has an index of refraction higher than the substrate 203. If a film is used having a lower index of refraction, a hollow dielectric waveguide is produced, such as used in some laser applications.

Figure 19:
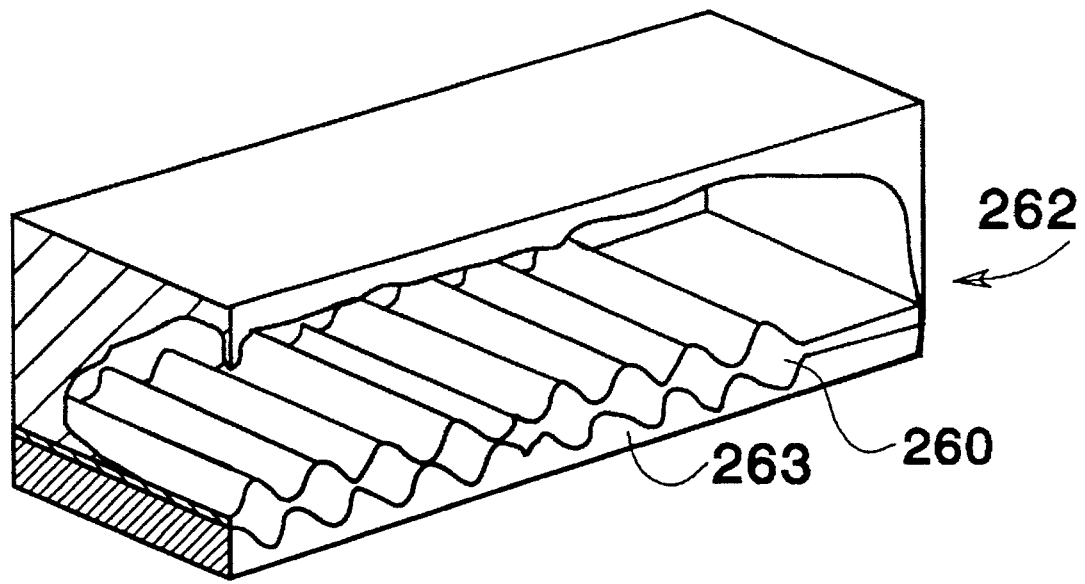
FIG. 19 is an alternate embodiment of FIG. 8.

The embodiment illustrated in FIG. 19 shows an alternative to the transparent planar waveguide 202 of FIG. 8. The planar waveguide 262 is manufactured as described in FIG. 8, however the one surface of the substrate 263 is designed to form the corrugations. The thin film 260 is deposited on the corrugations, creating a mirror image between the substrate 263 and the film 260. This combination provides enhanced behavior and results in a narrower bandwidth.

EXAMPLE 3

Cylindrical Cross-section waveguide.

Figure 9:
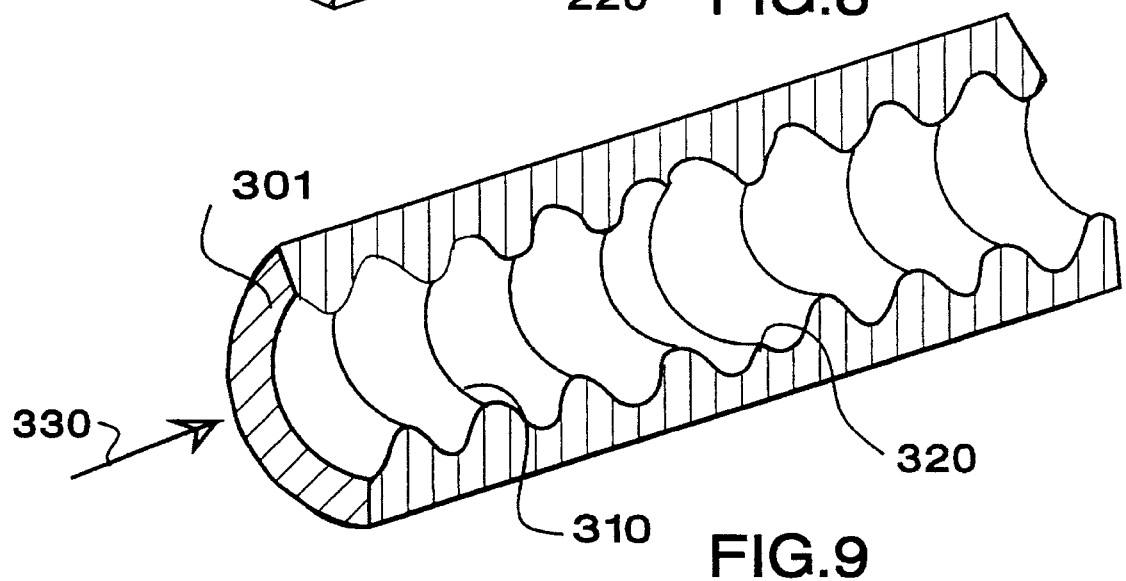
FIG. 9 is an illustration of an embodiment of the current invention of cylindrical cross-section.

In this embodiment, illustrated in FIG. 9, a hollow, or dielectric filled, metallic cylinder 301 is employed with a wave propagation direction 330. The cylindrical 301 cross-section waveguide is dimensioned in accordance with the desired frequency range and other parameters as is well known in the art. The inner conductor surface 310 is perturbed sinusoidally as described above. In the center 320, the phase of the curve is reversed.

EXAMPLE 4

Surface acoustic waveguide

Figure 10:
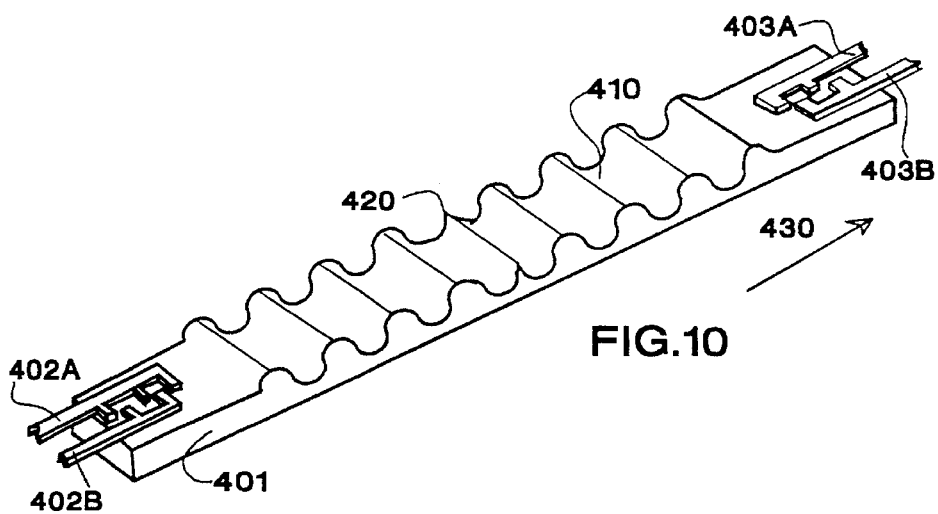
FIG. 10 is an illustration of an embodiment of the current invention of rectangular cross-section surface acoustic.

In this embodiment, illustrated in FIG. 10, an electromagnetic wave is coupled into a piezoelectric crystal 401, creating a surface acoustic wave propagating in direction 430. The piezoelectric crystal 401 is dimensioned in accordance with standard techniques well known in the art. One surface 410 of the piezoelectric crystal 401 has a sinusoidal disturbance as described above. At the center point 420, the disturbance reverses phase.

The electrodes 402A and 402B inject the electric signals into the SAW filter. The filtered signals are then read out at electrodes 403A and 403B.

EXAMPLE 5

Microstrip

Figure 11:
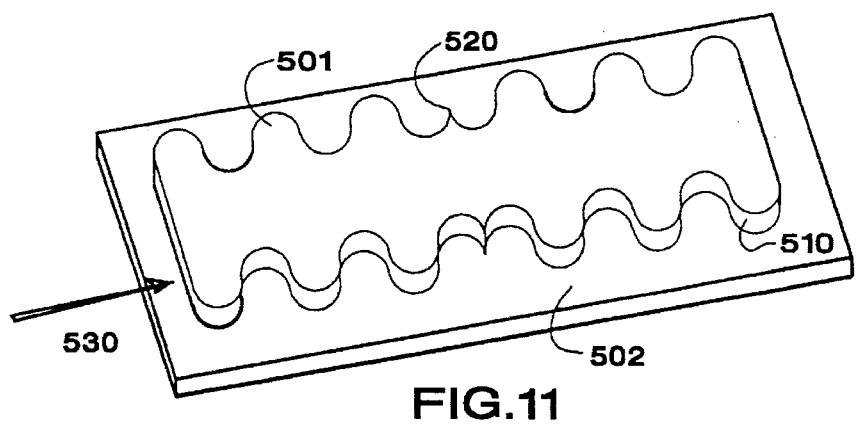
FIG. 11 is an illustration of a microstrip version of the current invention.

In the embodiment of FIG. 11, any of the numerous variations of striplines can be employed. As used herein, the term microstrip refers to a single, unshielded, conducting strip. If a shield is placed above the microstrip, it becomes a shielded stripline. Two adjacent parallel microstrips form a coplanar stripline. Illustrated in FIG. 11 is an embodiment in which a conductor 501 is employed over a ground plane 502 with a wave propagation direction indicated by arrow 530. The conductor 501 and ground plane 502 are separated by an insulation or dielectric layer not shown. The conductor 501 and ground plane 502 are dimensioned in accordance with the standard techniques which are well known in the art. The conductor edges undergo a sinusoidal variation 510 in accordance with the equations described above. The sinusoidal variation reverses phase at the mid-point 520.

COMPARATIVE EXAMPLE A

Figure 12:
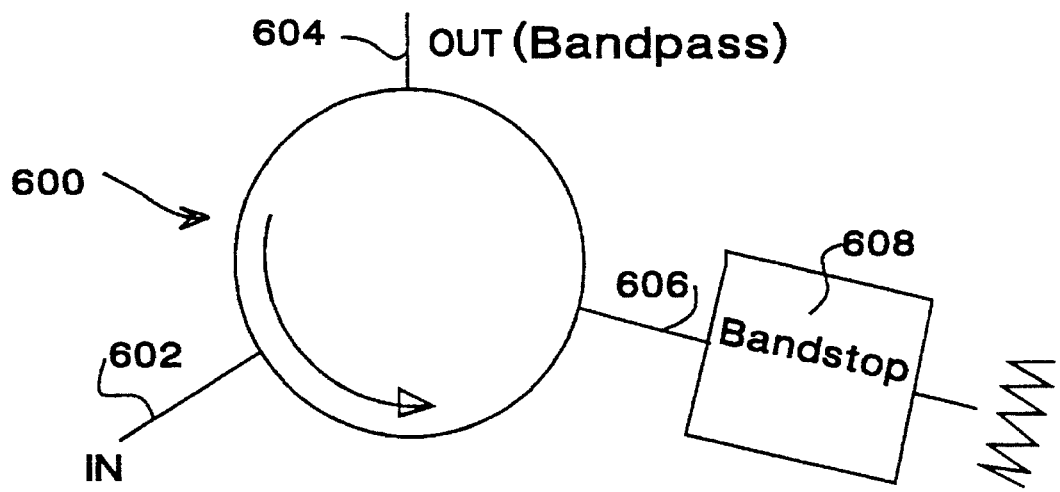
FIG. 12 is an illustration of the periodic filter of the prior art configured for bandpass operation.

Periodic filters of the prior art are basically of the stopband rather than the passband type. However, a passband filter arrangement can be obtained by using a circulator indicated generally as 600 in FIG. 12, and utilizing a three-port network with the input signal at in-port 602 and the stopband filter at port 606. The bandstop port 604 passes the signal when it is stopped at port 606 and vice versa. The bandwidth obtained with this type of filter is two orders of magnitude larger than that of the present invention. The circulator is a three port microwave device utilizing a ferrite that will cause the wave at the in-port 602 to travel counterclockwise, as illustrated by arrow A. The bandstop filter 608 at port 606 is a prior art, periodically corrugated waveguide, without the phase reversal at the midpoint as disclosed, which is terminated with a matched load. The bandstop filter 608 causes the wave to travel to out-port 604 so that the two port relationship between the in-port 602 and the bandpass port 604 is through the bandstop filter 608.

Figure 13:
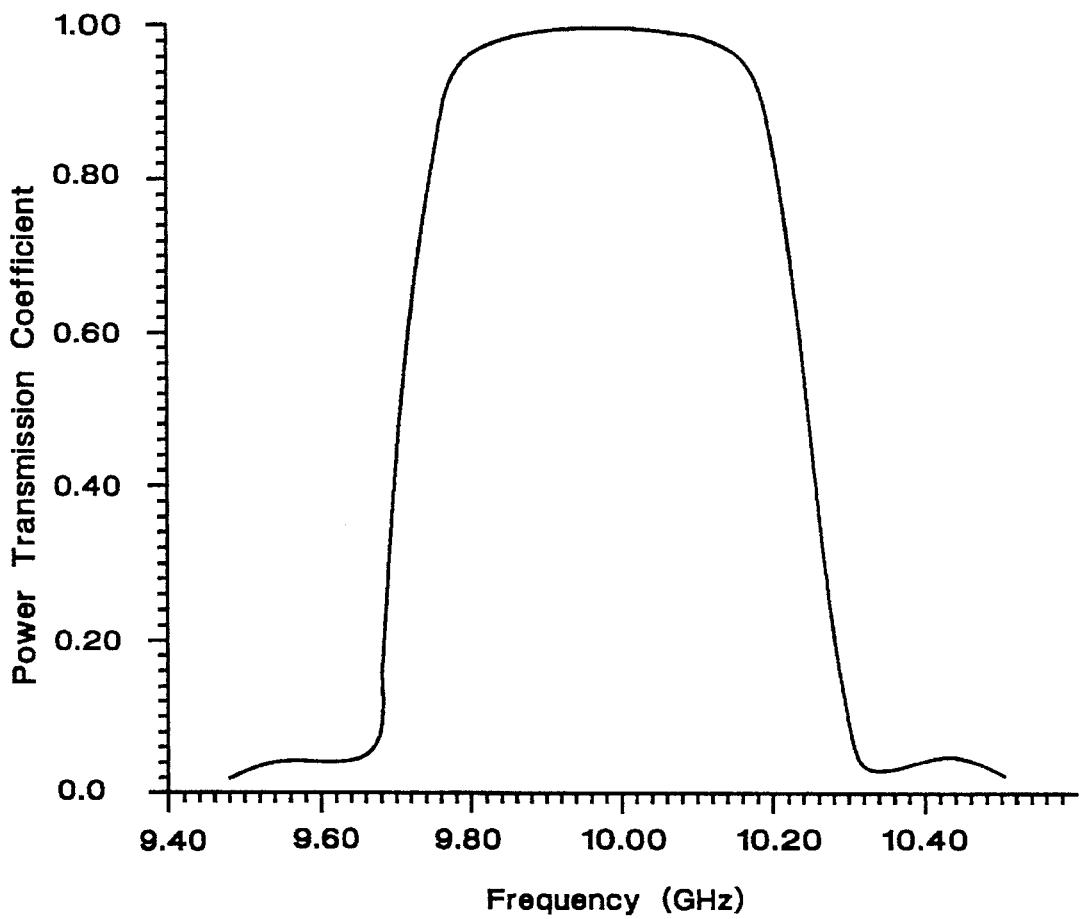
FIG. 13 is an illustration of the power/transmission coefficient of the typical periodic corrugation filter of the prior art of FIG. 12.

A typical calculated response to the circulator 600 is shown in FIG. 13, where the bandwidth is approximately 10 per cent of the carrier frequency. This is approximately 100 times larger than the bandwidth of the present invention.

EXAMPLE 6

One to Two coupler

Figure 14:
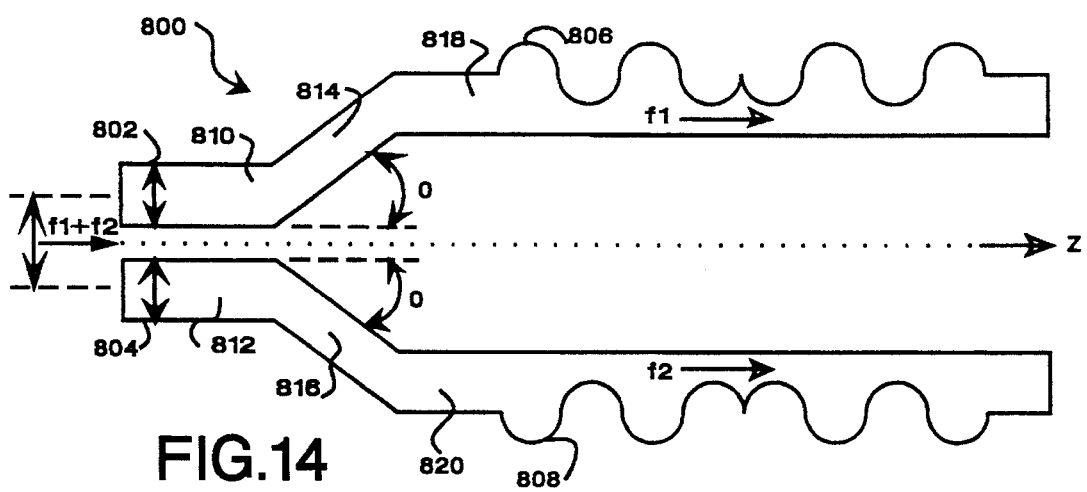
FIG. 14 is an illustration of a tapered coupler made from 2 parallel waveguides.

FIG. 14 shows a one-to-two coupler indicated generally as 800. This device is configured using two dielectric slab waveguides 802 and 804. The waveguides 802 and 804 have a coupler 810 and 812, respectively, with length of about >200 μm. The separation B between the couplers 810 and 812 is preferably 1.4 μm, measured from center to center. The waveguides 802 and 804 are angled at connectors 814 and 816 prior to extending to the body 818 and 820. The angle of the connectors 814 and 816 is indicated by arrows 0 and is preferably ≈1°–5°. The length of the connectors 814 and 816 are about ≈200 μm. The input $f_1$ and $f_2$ can be injected in either of the waveguides 802 or 804. The one-to-two tapered coupler is disclosed in further detail in Lessard, S., and Huang, W., Assessment of Coupled-Mode Theory for Tapered Optical Coupler, *Journal of Lightwave Technology*, Vol. 11, No. 3, March, 1993, and Weber, J., Spectral characteristics of coupled-waveguide Bragg-reflection tunable optical filter, *IEE Proceedings-J*, Vol. 140, No. 5, October 1993, which are incorporated herein by reference as through recited in full.

The instant invention utilizes the one-to-two coupler 800, incorporating the narrowband filter of the instant disclosure. One of the parallel lengths of each of the slab waveguides 802 and 804 bodies 818 and 820 are provided with corrugations 806 and 808. These corrugations carry periodic distortions of a wavelength corresponding to the carrier frequency of a selected communication channel. The incorporation of the corrugations 806 and 808 narrows the band, overcoming one of the known disadvantages, as set forth in Weber, supra. Any number of one-to-two couplers 800 can be combined for multiplexing or de-multiplexing. The one-to-two coupler 800 is useful for wavelength division multiplexing.

EXAMPLE 7

Microwave Transmitters

Figure 15:
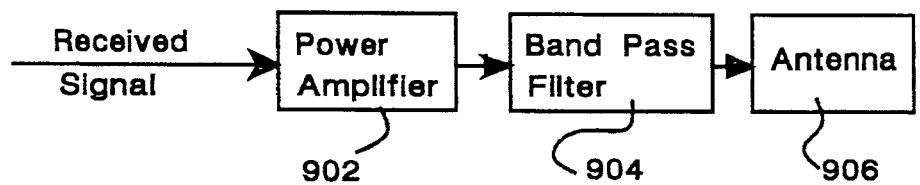
FIG. 15 is a block diagram of a microwave repeater

The filter disclosed in FIG. 15 has use in microwave transmitters as an element following the power amplifier 902 and preceding the antenna 906. This is especially useful in microwave repeaters where the weak microwave signal is amplified for retransmission. Amplification is a nonlinear process that gives an output signal with a larger bandwidth than the original input. In order to preserve the original bandwidth, a bandpass filter 904, modified as disclosed herein, is inserted between the power amplifier 902 and the antenna 906. The filter disclosed herein is advantageous in this type of an application as it provides virtually no interference with the power level of the amplified signal and because of its narrow passband.

Figure 16:
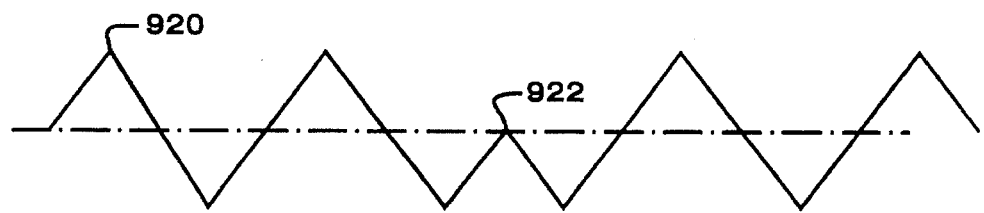
FIG. 16 is a side view of the periodic distortion of an alternate corrugation the current invention.
Figure 17:
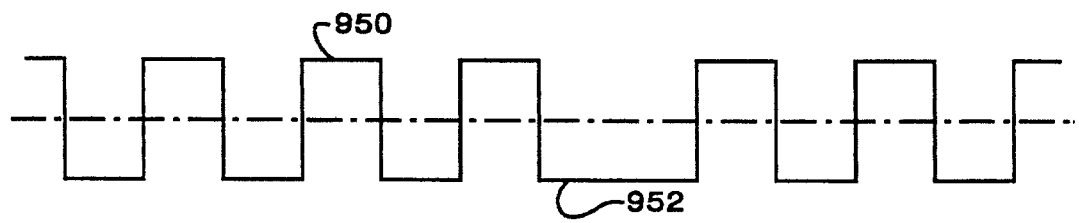
FIG. 17 is side view of the periodic distortion of an additional alternate corrugation the current invention.
Figure 18:
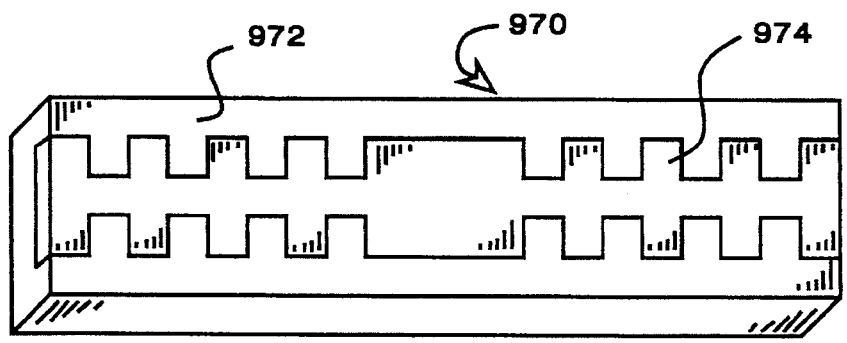
FIG. 18 is a microstrip utilizing the corrugation of FIG. 17.

FIGS. 16, 17 and 18 illustrate alternatives to the foregoing curved waves. In FIG. 16, the corrugations 920 are triangular, or saw tooth, with the point of reversal 922 at the point of zero amplitude.

In FIG. 17, the corrugations 950 are rectangular, however the point of reversal 952 is not at zero amplitude. From the standpoint of mathematics, the point of reversal should go through zero amplitude. This means that the amplitude should rise to zero for the wave on the left of the point of reversal but should drop again to the same level at the same point for the wave on the right. For this to happen there must be zero thickness, or no material barrier at that point. When rectangular corrugations 950 are incorporated, the wave is like a time periodic signal, rising and falling instantaneously by the same amount. The two effects cancel each other, as illustrated in FIG. 17, without going through zero. In FIG. 18 illustrates a microstrip 970 wherein the rectangular corrugations of FIG. 17 are incorporated in a waveguide 974 which has been embedded into a substrate 972.

The generic formula for calculating the disclosed invention is:

$$f(z)=1+A\ F_p(K_w,z) \text{ for } 0 \leq z \leq L/2, \text{ and}$$

$$f(z)=1-A\ F_p(K_w,z) \text{ for } L/2 \leq z \leq L$$

where $F_p(K_w,z)$ is a periodic function with period $P_w=2\pi/K_w$ f(z) is a distance perpendicular to the boundary, z is a distance along the wall in the direction of wave propagation A is a dimensionless amplitude <<1

$k_w$ is the boundary wave number chosen to satisfy the Bragg condition $k_w=2k_m$ L is the length of the filter portion waveguide.

When the distortion is sinusoidal, $F_p(K_w z)=\text{Sin } K_w z$. To utilize the rectangular distortion the formula would be adjusted so that $$F_r(K_w z) = +1 \text{ for } 0 \leq z \leq \frac{P_w}{2}, \text{ and}$$

$$F_r(K_w z) = -1 \text{ for } \frac{P_w}{2} \leq z \leq P_w.$$

The triangular distortion requires the formula to be adjusted wherein $$F_t(K_w z) = 1 - \frac{2K_w z}{\pi} \text{ for } 0 \leq z \leq \frac{P_w}{2}, \text{ and}$$

$$F_t(K_w z) = \frac{2K_w z}{\pi} - 3 \text{ for } \frac{P_w}{2} \leq z \leq P_w.$$

What is claimed is:

1. A waveguide filter comprising:

a waveguide structure which supports propagation of a wave along the waveguide, said waveguide structure containing a boundary, said waveguide structure containing a filter portion having a portion of said boundary with a distortion following:

$f(z)=1+A F_p(K_w z)$ for $0 \leq z \leq L/2$, and $f(z)=1-A F_p(K_w z)$ for $L/2 \leq z \leq L$ where $F_p(K_w z)$ is a periodic function with period $$P_w = \frac{2\pi}{K_w}$$

f(z) is a distance perpendicular to the boundary, z is a distance along the structure in the direction of wave propagation A is a dimensionless amplitude <<1

$k_w$ is the boundary wave number chosen to satisfy the Bragg condition $k_w=2k_m$ L is the length of the filter portion waveguide.

2. The waveguide filter of claim 1 wherein said distortion is sinusoidal and $F_p(K_w z)=\text{Sin } K_w z$.

3. The waveguide filter of claim 1 wherein said distortion is rectangular and $$F_r(K_w z) = +1 \text{ for } 0 \leq z \leq \frac{P_w}{2}, \text{ and}$$

$$F_r(K_w z) = -1 \text{ for } \frac{P_w}{2} \leq z \leq P_w.$$

4. The waveguide filter of claim 1 wherein said distortion is triangular and $$F_t(K_w z) = 1 - \frac{2K_w z}{\pi} \text{ for } 0 \leq z \leq \frac{P_w}{2}, \text{ and}$$

$$F_t(K_w z) = \frac{2K_w z}{\pi} - 3 \text{ for } \frac{P_w}{2} \leq z \leq P_w.$$

5. The waveguide filter of claim 1, wherein said waveguide structure comprises a transparent slab with a reflecting top and bottom surface forming said boundary and configured to propagate light along said slab, with said distortion being formed in one of said top and bottom surfaces so as to vary the distance between said top and bottom surfaces.

6. The waveguide filter of claim 1, wherein said waveguide structure comprises a hollow or dielectric filled rectangular cross-section conductive tube configured to propagate electromagnetic waves, the inner side of said conductive tube forming said boundary and wherein said distortion is formed along at least one side of said rectangular tube so as to vary the width of said tube along said at least one side.

7. The waveguide filter of claim 1, wherein said waveguide structure comprises a hollow or dielectric filled elliptical cross-section conductive tube configured to propagate electromagnetic waves, the inner side of said conductive tube forming said boundary and wherein said distortion is formed as a variation of the major and minor radius of the inner side of said conductive tube.

8. The waveguide filter of claim 1, wherein said waveguide structure comprises a thin rectangular slab which supports a vibrational wave along said slab, said boundary being the side surfaces of said rectangular slab, and wherein said distortion is formed along at least one side of said rectangular slab so as to vary the width of said slab along said at least one side.

9. The waveguide filter of claim 1, wherein said waveguide structure comprises a conductive plane and an elongated conductive strip above said conductive plane and wherein said distortion is formed along at least one edge of said elongated conductive strip so as to vary the width of said strip along said at least one edge.

10. A method of filtering a wave signal comprising:

injecting an electromagnetic or vibrational wave into a waveguide having a boundary and filter portion, and receiving or detecting the portion of the wave transmitted by said waveguide wherein the said filter portion of said waveguide contains a portion which has a distortion following:

$f(z)=1+A F_p(K_w z)$ for $0 \leq z \leq L/2$, and $f(z)=1-A F_p(K_w z)$ for $L/2 \leq z \leq L$ where $F_p(K_w z)$ is a periodic function with period $$P_w = \frac{2\pi}{K_w}$$

f(z) is a distance perpendicular to the boundary, z is a distance along the boundary in the direction of wave propagation A is a dimensionless amplitude <<1

$k_w$ is the boundary wave number chosen to satisfy the Bragg condition $k_w=2k_m$ L is the length of the filter portion waveguide.

11. The method of filtering a wave signal of claim 10 wherein said distortion is sinusoidal and $F_p(K_w z)=\text{Sin } K_w z$.

12. The method of filtering a wave signal of claim 10 wherein said distortion is rectangular and $$F_r(K_w z) = +1 \text{ for } 0 \leq z \leq \frac{P_w}{2}, \text{ and}$$

$$F_r(K_w z) = -1 \text{ for } \frac{P_w}{2} \leq z \leq P_w.$$

13. The method of filtering a wave signal of claim 10 wherein said distortion is triangular and $$F_t(K_w z) = 1 - \frac{2K_w z}{\pi} \text{ for } 0 \leq z \leq \frac{P_w}{2}, \text{ and}$$

$$F_t(K_w z) = \frac{2K_w z}{\pi} - 3 \text{ for } \frac{P_w}{2} \leq z \leq P_w.$$

14. The method of filtering a wave signal of claim 10, wherein said waveguide comprises a transparent slab with a reflecting top and bottom surface forming said boundary and configured to propagate light along said slab, with said distortion being formed in one of said top and bottom surfaces so as to vary the distance between said top and bottom surfaces.

15. The method of filtering a wave signal of claim 10, wherein said waveguide comprises a a hollow or dielectric filled rectangular cross section conductive tube configured to propagate electromagnetic waves, the inner side of said conductive tube forming said boundary and wherein said distortion is formed along at least one side of said rectangular tube so as to vary the width of said tube along said at least one side.

16. The method of filtering a wave signal of claim 10, wherein said waveguide comprises a hollow or dielectric filled elliptical cross section conductive tube configured to propagate electromagnetic waves, the inner side of said conductive tube forming said boundary and wherein said distortion is formed as a variation of the major and minor radius of the inner side of said conductive tube.

17. The method of filtering a wave signal of claim 10, wherein said waveguide comprises a thin rectangular slab which supports a vibrational wave along the slab, said boundary being the side surfaces of said rectangular slab, and wherein said distortion is formed along at least one side of said rectangular slab so as to vary the width of said slab along said at least one side.

18. The method of filtering a wave signal of claim 10, wherein said waveguide comprises a conductive plane and an elongated conductive strip above said conductive plane and wherein said distortion is formed along at least one edge of said elongated conductive strip so as to vary the width of said strip along said at least one edge.

* * * * *